United States Patent [19]

Wells et al.

[11] Patent Number: 4,862,264

[45] Date of Patent: Aug. 29, 1989

[54] METHOD OF CODING A VIDEO SIGNAL FOR TRANSMISSION IN A RESTRICTED BANDWIDTH

[75] Inventors: Nicholas D. Wells, Brighton; Michael J. Knee, Guildford; Charles P. Sandbank, Reigate, all of United Kingdom

[73] Assignee: British Broadcasting Corporation, London, England

[21] Appl. No.: 94,671

[22] PCT Filed: Dec. 23, 1986

[86] PCT No.: PCT/GB86/00798

§ 371 Date: Oct. 5, 1987

§ 102(e) Date: Oct. 5, 1987

[87] PCT Pub. No.: WO87/04033

PCT Pub. Date: Jul. 2, 1987

[30] Foreign Application Priority Data

Dec. 24, 1985 [GB] United Kingdom ............. 8531779
Aug. 28, 1986 [GB] United Kingdom ............. 8620801

[51] Int. Cl.$^4$ ......................................... H04N 7/13
[52] U.S. Cl. ................................. 358/138; 358/136; 358/105
[58] Field of Search ............... 358/136, 135, 138, 105

[56] References Cited

U.S. PATENT DOCUMENTS

| | | | |
|---|---|---|---|
| 3,715,483 | 2/1973 | Limb | 358/133 |
| 4,369,464 | 1/1983 | Temime | 358/136 |
| 4,383,272 | 5/1983 | Netravali | 358/136 |
| 4,575,756 | 3/1986 | Furukawa | 358/136 |
| 4,691,329 | 9/1987 | Juri | 358/136 |

FOREIGN PATENT DOCUMENTS

| | | |
|---|---|---|
| 0103380 | 3/1984 | European Pat. Off. . |
| 0146713 | 7/1985 | European Pat. Off. . |
| 1046779 | 8/1963 | United Kingdom . |
| 1365918 | 7/1971 | United Kingdom . |
| 1568292 | 5/1980 | United Kingdom . |
| 2042852 | 9/1980 | United Kingdom . |
| 1584351 | 2/1981 | United Kingdom . |
| 2128847 | 5/1984 | United Kingdom . |
| 2123646 | 2/1984 | United Kingdom . |
| 2134346 | 8/1984 | United Kingdom . |
| 2144301 | 2/1985 | United Kingdom . |
| 2166923 | 5/1986 | United Kingdom . |

OTHER PUBLICATIONS

A High-Definition Satellite Television Broadcast System-MUSE (Kimura and Ninomiya), Journal of I.E.R.E., Oct. 1985, vol. 55, No. 10, pp. 353-356.

BBC Research Report (R. Storey et al.), Jun. 1986.

Practical Problems of Implementing a Conditional Replenishment Over an Error Prone Channel (M. Carr et al.) (date & source unknown).

A Video Encoding System with Conditional Picture-Element Replenishment (F. W. Mounts), B.S.T.S., Sep. 1969, pp. 2545-2552.

The 128th SMPTE Technical Conference Paper (G. Thomas), Preprint No. 128-149, Oct. 24-29, 1986.

*Primary Examiner*—Howard W. Britton
*Attorney, Agent, or Firm*—Robert F. O'Connell

[57] ABSTRACT

A video signal is coded for transmission in a restricted bandwidth by sub-dividing a frame of picture information into a set of constituent blocks, measuring the amount of picture activity in each block, sampling the information in each block at a rate related to the amount of picture activity in that block, and adding to the coded block a supplementary signal indicating the sampling rate used for the block. Thus a decision is made on a block-by-block basis as to whether the block is transmitted with full accuracy or whether it can be adequately reconstructed from the previous frames.

35 Claims, 3 Drawing Sheets

METHOD OF CODING A VIDEO SIGNAL FOR TRANSMISSION IN A RESTRICTED BANDWIDTH

BACKGROUND OF THE INVENTION

This invention relates to the coding of video signals and more particularly to the coding of a video signal using adaptive sub-sampling to reduce the bandwidth/bit rate thereof.

The advent of high-definition television (HDTV) signals has led to a considerable amount of research into ways of reducing the bandwidth of such a transmitted HDTV signal without compromising the picture quality thereof unacceptably. In theory, it is possible to realise such a reduction in transmitted bandwidth by optimising the sampling rate according to the varying amounts of picture information present in a picture frame.

SUMMARY OF THE INVENTION

According to the present invention there is provided a method of coding a video signal for transmission in a restricted bandwidth, the method comprising the steps of sub-dividing a frame (or field) of picture information of the video signal into a set of constituent blocks, measuring the amount of picture activity in each block, sampling the picture information in a block at a rate related to the amount of measured activity in that block and adding to each thus coded block a supplementary signal which is related to the sampling rate used in that block.

Thus a decision is made on a block-by-block basis as to whether the block is transmitted to high accuracy or whether it can be adequately reconstructed from the previous frames.

In the method according to the invention, each video component is formed into two parts. The first part consists of the component signal sub-sampled in some manner. The samples occurring at an irregular rate can be written into a buffer store and read out, for transmission, at a regular rate. The samples may be transmitted in an analogue or digital form. The second part consists of a pilot signal to indicate the status of the sub-sampling.

BRIEF DESCRIPTION OF THE DRAWINGS

Specific embodiments of the present invention will now be described by way of example with reference to the accompanying drawings in which.

DETAILED DESCRIPTION OF THE PREFERRED EMBODIMENT

Figure 1:
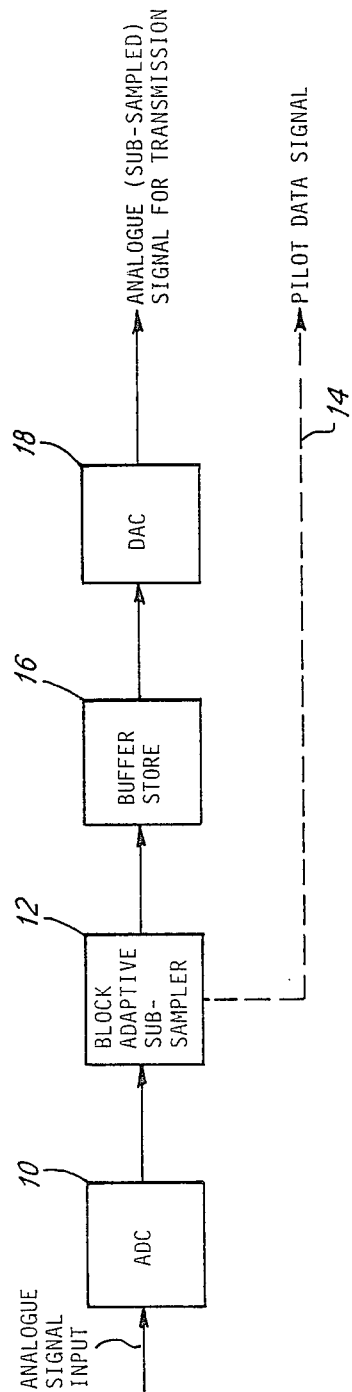
FIG. 1 is a block diagram of a coder for use in the method of the present invention.

Referring to FIG. 1, a picture is first sampled and split into blocks. For simplicity only the luminance component is shown. For the purposes of explanation the blocks have been limited to cover 4 samples by 4 picture lines, in practice there will be substantially more samples than this. The "activity" of each block is then measured by a method such as one of those described below. For a fixed proportion of the blocks in each frame, i.e., the most active in that frame, all of (or a high percentage of) the samples within these blocks are written into a buffer store before transmission. It is of course equally the case that the present invention could be applied to a video signal on a field-by-field basis instead of frame-by-frame. For the remaining blocks within each picture, only a small percentage (which may be zero) of the samples from each of these blocks are written into the buffer store before transmission. The sub-sampling may be accompanied by some pre-filtering of the source samples. For example, if only one sample per block is to be transmitted for each inactive block, then this sample may have a value which corresponds to the mean value of the sample values within that block.

It is preferred to pre-filter the source samples before sub-sampling so as to prevent aliasing in subsampled areas of the picture, thereby improving the quality of the decoded picture.

Analogue video signals are converted to digital signals at a high enough sampling rate to give a full-resolution picture by an analogue-to-digital converter 10. The digital video signal is then sub-sampled on a block-by-block basis by a sub-sampler 12 which also derives the appropriate pilot data signal 14 containing the sampling mode information.

The samples from the sub-sampler emerge at an irregular rate. A buffer store 16 smooths the rate at which the samples are transmitted after which they are reconverted to analogue form by a digital-to-analogue converter 18. The exact proportion of the blocks that can be transmitted with a high sample rate is determined by the bandwidth of the transmission channel and the restrictions that this imposes on the average, or "smoothed", sample rate that may be transmitted over the channel. By transmitting this part of the signal in analogue form a lower transmission bandwidth can be used than would be necessary for digital signals.

The second part of the signal, namely a one-bit-per-block (digital) pilot signal, describes whether the block has been transmitted with a high or low sample rate. The two parts of the signal may, most simply, be combined for transmission by time division multiplexing; transmitting the pilot data signal for a whole frame at the beginning of the frame interval, for example.

The decoder which comprises a frame store then receives the pilot data signal and a sequence of sample values. Using the pilot data signals the decoder can assign the sample values to appropriate blocks within each frame and also to appropriate positions within each block.

Thus, there are two subsampling modes: "high accuracy", in which all or nearly all of the samples in the block are transmitted, and "low accuracy" in which only a very few samples (or even none at all) are transmitted. The choice of subsampling mode for each block has to be transmitted to the decoder as a digital data signal. Only one bit of digital data is required for each block.

In order to construct sample values for all the sample sites within a frame the decoder must estimate, by extrapolation or interpolation, sample values for those sample sites contained within the blocks which have been transmitted at a low sample rate. Using the information transmitted this may be done in one of several ways.

Choice of the optimum method will depend on application, complexity and/or quality requirements. The method of extrapolation or interpolation may be switched on a frame-by-frame basis as a function of picture content, preferably with appropriate signalling from the coder to the decoder.

Any of the following methods may be used, at the decoder (and also at the coder if it is required to form a locally-decoded signal), to estimate the sample values for sample sites within inactive blocks which have been transmitted at a low sample rate:

(a) The current block of samples may be the repeat of the corresponding block of samples from the previous frame:

i.e., $I'(i,j,k) = I'(i,j,k-1)$ where:

I(i,j,k) refers to the sample value at coordinate position (i,j,k) where i,j,k are integers. i refers to the horizontal sample position along a line, j refers to the vertical position within a frame (i.e., line number within a frame) and k refers to the frame number.

$I'(i,j,k)$ represents the decoded sample value (at coder or decoder) at the coordinate location (i,j,k).

If this method of interpolation is used the coder transmits no samples for each inactive block.

(b) The inactive block may be updated as a rate of one (or more) sample(s) per frame. In this case, the coder transmits one (or more) sample(s) per inactive block per frame such that an inactive block would be completely refreshed after sixteen frames (or less) for 4 by 4 samples per block depending on the number of samples updated per frame. As mentioned, there are of course substantially more samples per block in a practical example.

(c) One sample per inactive block may be transmitted and this sample used to approximate the mean of the (input) sample values within the block. The sample values at sites within each inactive block can then be estimated by spatial interpolation using the mean values of the surrounding blocks, be they active or inactive.

(d) As in (c) above, the mean, $\bar{I}_k$, of each inactive block may be transmitted but the decoder reconstructs each inactive block by adding to this received mean the "shape" of the block from the corresponding position in the previous frame. The "shape" of a block is a set of values corresponding to the difference between the individual values and the mean value of the block.

i.e., $I'(i,j,k) = \bar{I}_k + [I'(i,j,k-1) - \bar{I}_{k-1}]$

Thus the displayed samples for that block are updated in dependence upon the change in the mean sample value.

The advantage of this method is that following a scene change a low-resolution version of the new scene will be available immediately and the detail will be built up over several frames. This corresponds closely with the way in which the eye's spatial frequency response changes following a scene change.

Methods (a) or (d) above can be used in conjunction with motion compensation. In this case it is required that at least one motion vector measurement is transmitted for each inactive block. This motion vector data can be transmitted along with the digital pilot data part of the signal. The decoder can then form estimates of the sample values within the inactive blocks in the current frame using information from the previous frame shifted according to the local motion vector. For example method (a) becomes:

$I'(i,j,k) = I'[i - d_x(i,j,k), j - d_y(i,j,k), k-1]$ where $d_x(i,j,k)/d_y(i,j,k)$ represent the horizontal/vertical components of the motion between frames k−1 and k for information at location (i,j,k). One or more motion vectors per inactive block may be transmitted. In this case $d_x(i,j,k)$ and $d_y(i,j,k)$ will be the same for all samples within the given block.

The motion vector can be derived as described in a paper presented at the 128th SMPTE Technical Conference, Oct. 24–29, 1986 New York, Preprint No. 128-49, "HDTV Bandwidth Reduction by Adaptive Subsampling and Motion Compensation DATV Technique".

In order to decide whether to transmit a block at high or at low accuracy, the "activity" of the block is measured. If the activity exceeds some threshold, the block, known as an "active" block, is transmitted at high accuracy. "Inactive" blocks are transmitted at low accuracy.

The activity of a block can be defined in several ways. One technique, for example, is to define the activity as the maximum value (or alternatively the mean square value) of the inter-frame difference occurring within a block, using either the input or the reconstructed frame to define the previous frame. Use of the reconstructed frame is preferred. However, this requires that the coder also contains elements of a decoder in order to reconstruct a frame from information which has been (or will be) transmitted to the actual decoder.

Alternatively, a measure of activity derived from the peak-to-peak variation inside a block, or the mean-square deviation from the mean within the block, could be used.

The above activity measures can be advantageously modified to form an "accumulating activity measure" as follows: for a given block, the activity measure is accumulated from picture frame to picture frame. The accumulating sum is only reset to zero when a block is transmitted at a high sample rate. The advantage of this cumulative modification over the more conventional measurement of activity is that it reduces the possibility of those areas or blocks of relative inactivity being ignored for excessive periods which could give rise to noticeable impairment of picture quality.

The above activity measures can also be modified to include the effect of motion compensation if this is also used for extrapolation/estimation of the sample values in the inactive blocks.

The picture activity of a block of samples within a frame (or field) may be measured in many ways, four examples of which are given below.

The examples described below involve only the luminance component of the picture. However, when calculating how many blocks can be transmitted at high accuracy, it has been assumed that the colour difference transmitted sample rate is half that of the luminance in active blocks and equal to that of the luminance in inactive blocks.

(a) Spatial activity measure (As):

$$A_s = \sum_{\text{block}} |I(i,j,k) - \bar{I}_k|^\alpha$$

where $I_k$ is the mean of the samples within the given block and $\Sigma I(i,j,k)$ represents the sum over all coordinate values i and j within a given block in a given frame k. Typically $\alpha=2$.

Active blocks are transmitted at high accuracy, whereas for each inactive block only one sample, corresponding to $\bar{I}_k$, is transmitted. In the decoder, samples in inactive blocks are reconstructed by linear interpolation between the means of surrounding blocks.

Alternatively, the maximum peak-to-peak variation or the peak variation from the mean within the block could be used.

(b) Temporal activity measure (Ak):

In its simplest form, this technique is the same as conditional replenishment operated on a block-by-block basis. The activity measure for a block is an estimate of how the block has changed from the previous frame to the current frame. For example:

$$Ak = \sum_{block} |I(i,j,k) - I(i,j,k-1)|^\alpha$$

or $$A'k = \sum_{block} |I(i,j,k) - I'(i,j,k-1)|^\alpha$$

Ak is the preferred activity measure. Here $\alpha$ can be greater than 2, and this may reflect the perceived picture activity more closely. Again, the maximum peak difference could be used rather than an averaged measure.

As before, active blocks are transmitted at high accuracy, but inactive blocks are reconstructed using information from the previous frame. One way to do this is simply to repeat the block from the previous frame.

(c) Accumulating activity measure ($[Ak]_{acc}$):

Any of the previous activity measures may be accumulated or integrated from frame to frame for a given block as shown in the following examples using the temporal activity measure, Ak. Assuming, say, that the block in question is transmitted at the high rate in frames $(k-1)$ and $(k+N)$ and at the lower rate for frames k to $(k+N-1)$, then $[A'k]_{acc} = A'_k$ $[A'_{k+1}]_{acc} = A'_k + A_{k+1}$ $[A'_{k+N}] = A_k + A_{k+1} + \ldots + A_{k+N-1} + A_{k+N}$ $[A_{k+N+1}]_{acc} = A_{k+N+1}$ An alternative, more general, form for the accumulating activity measure is as follows, again using the activity measure Ak by way of an example.

$[A'_k]_{acc} = aA'_k + b[A'_{k-1}]^\gamma_{acc}$ where a, b and $\gamma$ are constants. This last accumulating sum is again cleared when the block in question is transmitted at the high rate.

In one example of a system embodying the invention it was possible to transmit an average proportion p=0.20 of the blocks at high accuracy. The picture quality obtainable at this value of p is reasonable, if rather noisy. One way to increase the value of p significantly is to transmit the active blocks at half the full sample rate, by subsampling the block in a field quincunx pattern. With this technique, nearly half the blocks can be transmitted at high accuracy and the subjective quality is good; however, the full range of spatial frequencies that ought to be carried is not available and impairments can be seen on some critical moving sequences. Another way to increase the proportion of transmitted samples is to increase the block size to, say, 8×8.

(d) A block adaptive sub-sampling technique may be used in conjunction with motion compensation. In this case, the blocks which are not transmitted at the high sample rate are updated using information from the previous frame, shifted by an amount corresponding to an estimate of the motion between frames; i.e., the best estimate, $\hat{I}(i,j,k)$, of the current frame (that is available to the decoder) is given by $$\hat{I}(i,j,k) = I'(i - d_x(i,j,k), j - d_y(i,j,k), k-1)$$

$d_x(i,j,k)$ and $d_y(i,j,k)$ need not necessarily be measured to the nearest integer number of pixel intervals provided that the appropriate spatial interpolation of the previous frame information is employed.

The average motion for each 8×8 block can be measured by means of an exhaustive search, in which motion vectors extending to $\pm 7$ pixels horizontally and $\pm 7$ field-lines vertically are applied in turn to the block, and a minimum value of the resulting mean square difference with the previous decoded frame is sought.

Figure 3:
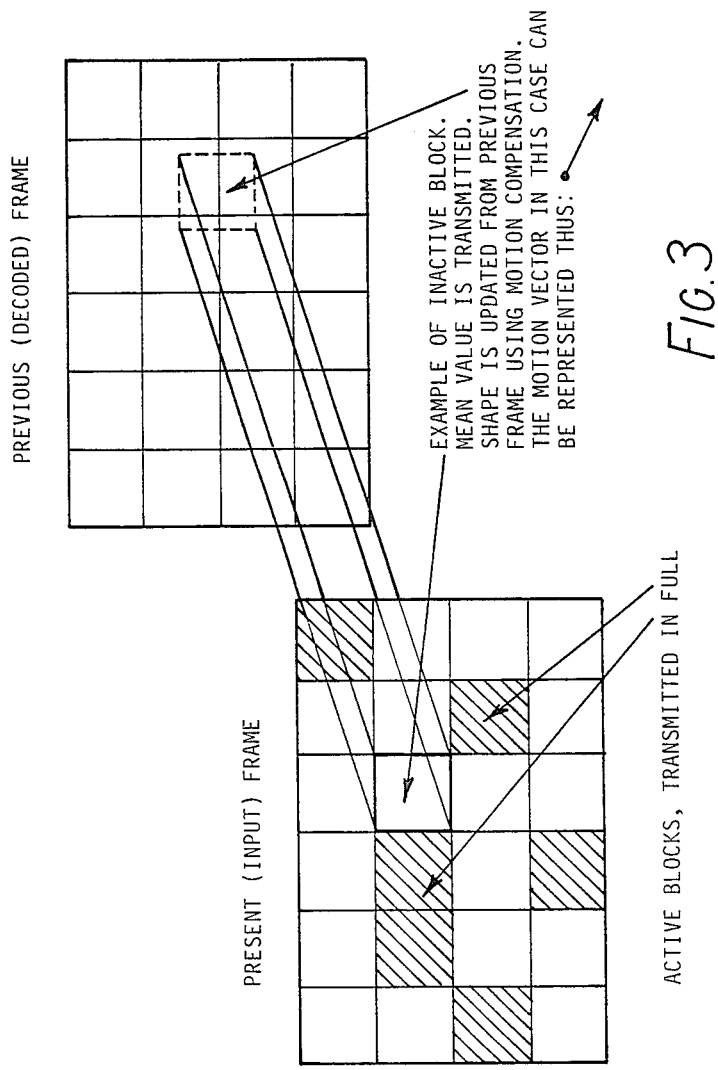
FIG. 3 is a diagram illustrating the principle of motion-compensated coding in according with the invention.

Motion vectors are calculated for all blocks and the contribution to the integrated activity measure from the current frame is taken to be the minumum mean square error found during the searching process. The integrated activity measure is modified slightly to approximate accumulation along the direction of motion. Each inactive block is reconstructed using the block in the previous frame, displaced according to the motion vector, as illustrated in FIG. 3.

Another way of generating the motion vectors is as described in the above-mentioned SMPTE paper No. 128-49.

Suitable modifications of the temporal activity measure and the accumulating temporal activity measure could be made as follows:

$$[MA_k] = \sum_{block} |I(i,j,k) - I(i - d_x(i,j,k), j - dy(i,j,k), k-1)|^\alpha$$

or $$[MA'_k] = \sum_{block} |I(i,j,k) - \hat{I}(i,j,k)|^\alpha$$

and $$[MA'_k]_{acc} = a(MA'_k) + b[MA'_{k-1}]^\gamma_{acc}$$

where, again, the accumulating sum is cleared when a block is sent to full accuracy. can be applied, in particular where one motion vector has been used as an average estimate of the motion vector for all samples within a given block, by taking into account, in the accumulation, the fact that information from surrounding blocks has, because of motion, entered the current block between frames $k-1$ and k.

An accumulating activity measure, $[MA(i,j,k-1)]_{Macc}$, is first assigned to each sample site in the previous frame by sharing out the accumulating measure of a block between the samples of that block.

$$\text{e.g. } [MA'(i,j,k-1)]_{Macc} = \frac{1}{N_B} [MA_{k-1}]_{Macc}$$

for each block in frame $k-1$, where $N_B$ is the number of samples in a block. Then, for a given block in frame k $$[MA_k{}^1]_{Macc} = a(MA_k{}^1) + b\left[\sum_{block} MA(i-d_x, j-d_y, k-1)_{Macc}\right]^{\gamma}$$

where a, b, and $\gamma$ typically have values of unity. $d_x$ and $d_y$ are the horizontal and vertical components of the block motion vector (for frame k) respectively. Again, a given accumulating sum is cleared when the corresponding block is sent with a high sample rate. This version of the motion-compensated accumulating activity measure works well in particular for pictures where there is 'global' motion in the scene as, for example, with a camera pan.

Figure 2:
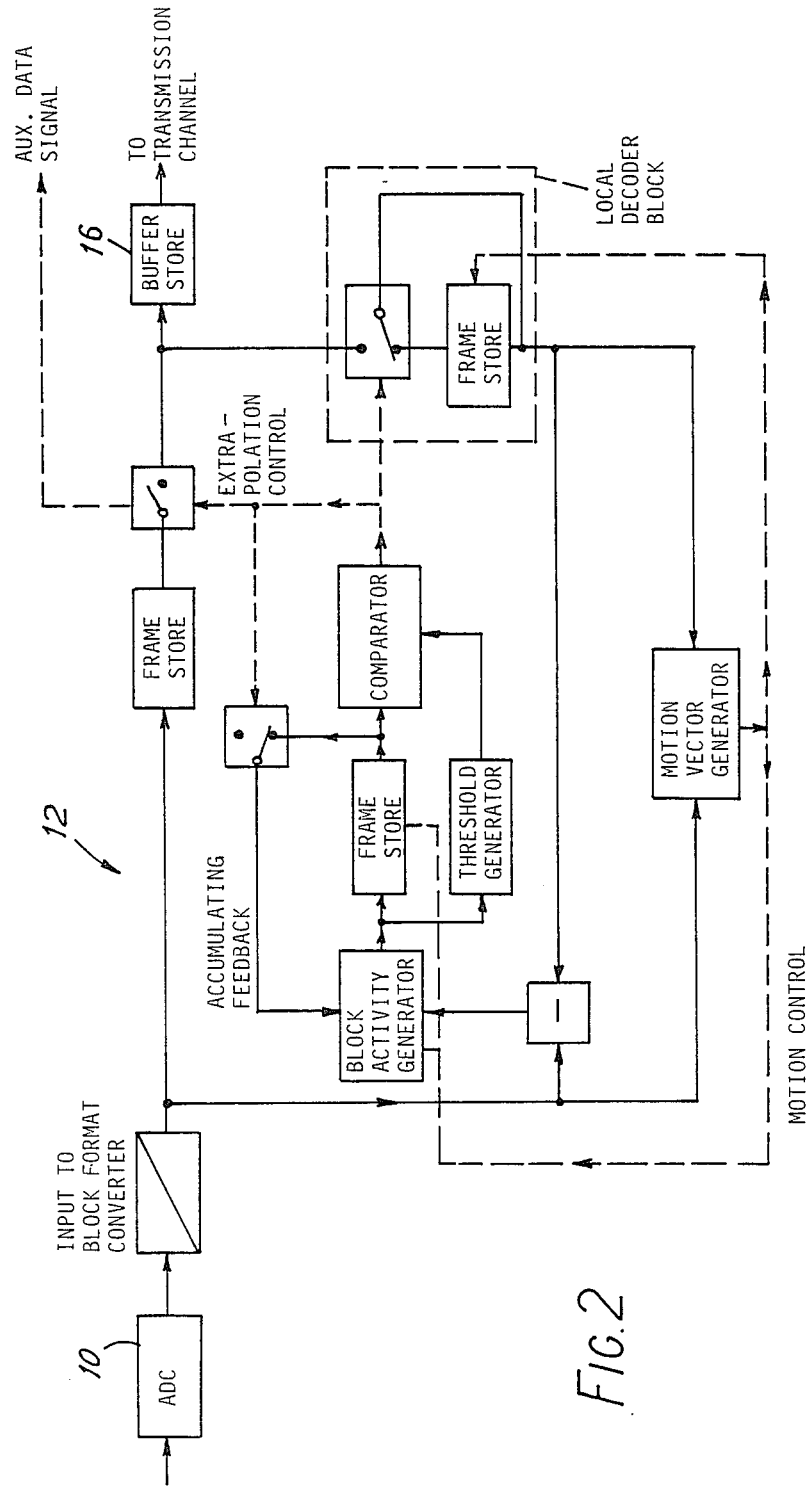
FIG. 2 is a schematic diagram of a sub-sampler used in the coder of FIG. 1.

The example of a bandwidth reduction system described above is essentially a "two-pass" system. The activities of all the blocks within a frame are measured during the first "pass". Then, in the second pass a fixed proportion of the blocks within a frame can be selected for transmission at a high rate. This means that the number of samples transmitted per picture frame is constant. This simplifies the decoder at the expense of extra frame stores in the coder. A block diagram, giving an example of a hardware implementation of a block-adaptive sub-sampling coder using motion compensated, previous frame extrapolation, is shown in FIG. 2. In this example, the motion vector is measured between the input frame and the locally decoded frame. This tends to prevent a build-up of translational error. Alternatively, the motion could be measured across adjacent frames of the input picture sequence. The receiver circuitry can be similar to that used to produce the locally decoded frame.

It is possible to have a "one-pass" system in which the proportion of blocks transmitted per picture frame is not constant but has an average value equal to that of the two-pass case. The occupancy of the sample transmission buffer would then be used to vary an activity threshold level. Blocks with an activity measure above this threshold would be transmitted with a high sample rate. In this case the buffer would need to be large enough to be able to smooth out short term variations in average sample rate produced by rapid changes in picture activity.

In a practical bandwidth reduction system the number of bits per inactive block that can be allocated for describing the motion vector will be limited. One solution is to construct a limited set or "palette" of suitable motion vectors for each picture frame. Data describing this palette of vectors could be transmitted at the beginning of each frame, for example, along with the other (pilot) data signals. The pilot data signal describing the sub-sampling mode of each block could then be accompanied, for each inactive block, by a number describing the number of the most appropriate motion vector within the palette.

We claim:

1. A method of coding a video signal for transmission in a restricted bandwidth, the method comprising the steps of:
   sub-dividing a frame of picture information of the video signal into a set of constituent blocks;
   pre-filtering the video signal with a digital anti-aliasing filter;
   measuring the amount of picture activity in each block;
   coding a block by sampling the picture information in the block at a rate related to the amount of measured activity in that block;
   adding to each thus coded block a supplementary signal which is related to the sampling rate used in that block; and
   transmitting the coded video signal in analogue form.

2. A method as claimed in claim 1, wherein the signals corresponding to each sampled block are fed into a buffer store for retrieval and transmission at a regular rate.

3. A method as claimed in claim 1, wherein in blocks where a low sampling rate is used a sample is transmitted representing the mean sample value for that block.

4. A method as claimed in claim 1, wherein the measurement of picture activity in each block is made on a cummulative basis frame by frame taken from the last frame transmitted at a high sampling rate.

5. A method as claimed in claim 1, wherein the measurement of picture activity comprises the sum of a function of the difference between successive frames of the samples in a block.

6. A method as claimed in claim 5, wherein the said function is a power of greater than 2.

7. A method as claimed in claim 1, wherein at least one motion vector measurement is transmitted for each inactive block.

8. A method as claimed in claim 7, wherein a set of motion vectors are determined for each frame and one of the set of motion vectors is transmitted for each block.

9. A method of decoding a video signal encoded according to the method of claim 1, the method comprising:
   receiving the transmitted sampled video signal in analogue form and receiving associated supplementary signals;
   separating the supplementary signals;
   decoding the sampled video signal relating to each block by assuming a sampling rate in accordance with the corresponding supplementary signal; and
   storing the decoded signals.

10. A method as claimed in claim 9, wherein in blocks where n low sampling rate is used a sample is received representing the mean value for that block, and the other decoded samples for that block are updated in dependence upon the change in the mean sample value.

11. A method as claimed in claim 9, wherein at least one motion vector is received, and estimates are formed of sample values written blocks transmitted at a low sampling rate using information from a previous frame shifted in dependence upon the main vector.

12. A method as claimed in claim 1, wherein those blocks of a frame of picture information having a level of activity above a threshold are sampled at a higher resolution sampling rate than those having a level of activity below the threshold.

13. A method as claimed in claim 12, wherein the average sample rate of a frame is controlled by adjusting the said threshold.

14. A method as claimed in claim 13, wherein the threshold level is adjusted according to the measured the activity of those blocks in a frame to be encoded.

15. A method as claimed in claim 14, wherein the threshold level is variable in inverse relationship to the activity in a block.

16. Video signal coding apparatus for coding a video signal for transmission in a restricted bandwidth, comprising:
   digital anti-aliasing filter means for pre-filtering the video signal;
   means for sub-dividing a frame of picture information of the video signal into a set of constituent blocks:
   means for measuring the amount of picture activity in each block;
   means for coding a block by sampling the picture information in a block at a rate related to the amount of measured activity in that block;
   means for adding to each thus-coded block a supplementary signal which is related to the sampling rate used in that block; and
   means for transmitting the coded video signal in analogue form.

17. Video signal coding apparatus, as claimed in claim 16 wherein the means for coding a block includes means for deriving a mean sample value for blocks where a low sample rate is used.

18. Video signal coding apparatus as claimed in claim 16 wherein the activity measuring means comprises means for measuring activity on a cumulative basis frame by frame taken from the last frame transmitted at a high sampling rate.

19. A video signal coding apparatus as claimed in claim 16 wherein the activity measuring means comprise means for summing a function of the difference between successive frames of the samples in a block.

20. A video signal coding apparatus as claimed in claim 19 wherein the summing means comprises means for summing a power of greater than two of the difference between successive frames of the samples in a block.

21. A video signal coding apparatus as claimed in claim 16 comprising means for deriving and transmitting at least one motion vector for each inactive block.

22. A video signal coding apparatus as claimed in claim 21 comprising means for deriving a set of motion vector for each frame and for selecting and transmitting one of said for each block.

23. Video signal decoding apparatus for decoding a video signal encoded by the apparatus of claim 16, comprising:
   means for receiving transmitted sampled video signals in analogue form and associated supplementary signals;
   means for separating the supplementary signals;
   means for decoding the sampled video signal relating to each block by assuming a sampling rate indicated by the corresponding supplementary signal; and
   a frame store for storing the decoded samples.

24. A video signal decoding apparatus according to claim 23 wherein the receiving means includes means for receiving a sample representative of the mean value for that block and the means for decoding the sampled video signal means for updating the decoded samples for that block in dependence upon the change in the mean sample value.

25. A video signal decoding apparatus according to claim 24 wherein the receiving means includes means for receiving at least one motion vector and the decoding means includes means for forming estimates of sample values of written blocks transmitted at low sampling rates using information from a previous frame shifted in accordance upon the received motion vector.

26. A method of coding a video signal for transmission in a restricted bandwidth, the method comprising the steps of:
   sub-dividing a frame of picture information of the video signal into a set of constituent blocks;
   measuring the amount of picture activity in each block;
   coding a block by sampling the picture information in the block at a rate related to the amount of measured activity in that block;
   adding to each thus coded block a supplementary signal which is related to the sampling rate used in that block;
   transmitting the coded video signal;
   wherein in blocks where a low sampling rate is used a sample is transmitted representing the mean sample value for that block.

27. A method of decoding a video signal encoded according to the method of claim 26, the method comprising:
   receiving the transmitted sample video signal and receiving associated supplementary signals;
   separating the supplementary signals;
   decoding the sampled video signal relating to each block by assuming a sampling rate in accordance with the corresponding supplementary signal;
   in blocks where a low sample rate is used, receiving a sample representing the mean value for that block and updating other decoded samples for that block in dependence upon the change in mean sample value; and
   storing the decoded samples.

28. A method of coding a video signal for transmission in a restricted bandwidth, the method comprising the steps of:
   sub-dividing a frame of picture information of the video signal into a set of constituent blocks;
   measuring the amount of picture activity in each block on a cumulative basis frame by frame taken from the last frame transmitted at a high sampling rates;
   coding a block by sampling the picture information in the block at a rate related to the amount of measured activity in that block; and
   adding to each thus coded block a supplementary signal which is related to the sampling rate used in that block.

29. A method of coding a video signal for transmission in a restricted bandwidth, the method comprising the steps of:
   sub-dividing a frame of picture information of the video signal into a set of constituent blocks;
   measuring the amount of picture activity in each block by summing a function of the difference between successive frames of the samples in a block, the function being a power of greater than 2;
   coding a block by sampling the picture information in the block at a rate related to the amount of measured activity in that block; and adding to each thus coded block a supplementary signal which is related to the sampling rate used in that block.

30. A method of coding a video signal for transmission in a restricted bandwidth, the method comprising the steps of:
   sub-dividing a frame of picture information of the video signal into a set of constituent blocks;
   coding a block by sampling the picture information in the block at a rate related to the amount of measured activity in that block; and
   adding to each thus coded block a supplementary signal which is related to the sampling rate used in that block;
   determining for each frame, a set of main vectors; and
   transmitting, for each block measured as inactive, one of the set of motion vectors.

31. A method of decoding a video signal encoded according to the method of claim 30, the method comprising:
   receiving the transmitted sample video signal in analogue form and receiving associated supplementary signals;
   separating the supplementary signals including separating for each frame a set of motion vectors;
   decoding the sampled video signal relating to each block by assuming a sampling rate in accordance with the corresponding supplementary signal;
   estimating the sample values of written blocks transmitted at a low sampling rate, using information from a previous frame shifted in dependence upon one of the set of motion vectors; and storing the decoded samples.

32. Video signal coding apparatus for coding a video signal for transmission in a restricted bandwidth, comprising:
   means for sub-dividing a frame of picture information of the video signal into a set of constituent blocks;
   means for measuring the amount of picture activity in each block;
   means for coding a block by sampling the picture information in the block at a rate related to the amount of measured activity in that block;
   means for adding to each thus-coded block a supplementary signal which is related to the sampling rate used in that block; and
   means for transmitting the coded video signal; wherein the coding means further comprises means for deriving a mean sample value for a block of transmission if that block is sampled at a low sampling rate.

33. Video signal coding apparatus for coding a video signal for transmission in a restricted bandwidth, comprising:
   means for sub-dividing a frame of picture information of the video signal into a set of constituent blocks:
   means for measuring the amount of picture activity in each block on a cumulative basis frame by frame taken from the best frame transmitted at a high sampling rate;
   means for coding a block by sampling the picture information in the block at a rate related to the amount of measured activity in that block; and
   means for adding to each thus-coded block a supplementary signal which is related to the sampling rate used in that block.

34. Video signal coding apparatus for coding a video signal for transmission in a restricted bandwidth, comprising:
   means for measuring the amount of picture activity in each block by summing a function of the difference between successive frames of the samples in a block, the function being a power of greater than 2;
   means for coding a block by sampling the picture information in the block at a rate related to the amount of measured activity in that block; and
   means for adding to each thus-coded block a supplementary signal which is related to the sampling rate used in that block.

35. Video signal coding apparatus for coding a video signal for transmission in a restricted bandwidth, comprising:
   means for sub-dividing a frame of picture information of the video signal into a set of constituent blocks;
   means for measuring the amount of picture activity in each block;
   means for coding a block by sampling the picture information in the block at a rate related to the sampling rate used in that block;
   means for determining, for each frame, a set of motion vectors; and
   transmission means for transmitting the coded video signal and, for each block measured as inactive, one of the set of motion vectors.

* * * * *

UNITED STATES PATENT AND TRADEMARK OFFICE
CERTIFICATE OF CORRECTION

PATENT NO. : 4,862,264

DATED : August 29, 1989

INVENTOR(S) : Nicholas D. Wells et al.

It is certified that error appears in the above-identified patent and that said Letters Patent is hereby corrected as shown below:

Column 8, line 51, Claim 9, "signals" should be "samples".

Column 8, line 53, Claim 10, "n" should be "a".

Column 8, line 61, Claim 11, "main" should be "motion".

Column 11, line 15, Claim 30, "main" should be "motion".

Signed and Sealed this

Twenty-first Day of May, 1991

Attest:

HARRY F. MANBECK, JR.

Attesting Officer

Commissioner of Patents and Trademarks